Jan. 19, 1954 C. B. DALE 2,666,648

ADAPTER FOR PHONOGRAPH SPINDLES HAVING INTERNALLY POWERED RECORD PUSH-OFF MECHANISM

Filed April 16, 1952 2 Sheets-Sheet 1

INVENTOR.
COLIN B. DALE

BY Paul Kolisch

ATTORNEY.

INVENTOR.
COLIN B. DALE
BY Paul Koliach
ATTORNEY.

Patented Jan. 19, 1954 2,666,648

UNITED STATES PATENT OFFICE 2,666,648

ADAPTER FOR PHONOGRAPH SPINDLES HAVING INTERNALLY POWERED RECORD PUSH-OFF MECHANISM

Colin B. Dale, Oak Park, Ill., assignor to Webster-Chicago Corporation, Chicago, Ill., a corporation of Illinois Application April 16, 1952, Serial No. 282,634

7 Claims. (Cl. 274—10)

This invention relates to new and useful improvements in readily detachable adapters for phonographs permitting the playing and automatic changing of records having center holes of substantially larger diameter than the customary upstanding spindle of the phonograph turntable.

With this object in view, I provide a substantially cylindrical adapter which can be readily mounted on or removed from the spindle without employing special tools, and which will insure the proper depositing and centering of one record after the other on the turntable. The adapter is a unitary structure consisting of few parts which can be easily assembled and which may be operated not only automatically during the cycles of the record changer mechanism, but also manually at the will of the user.

These and other features of the invention will more clearly appear from claims and the following description of a preferred embodiment of the invention.

In the drawings, which illustrate only the few parts of the phonograph essential for the explanation of the invention:

Figure 1:
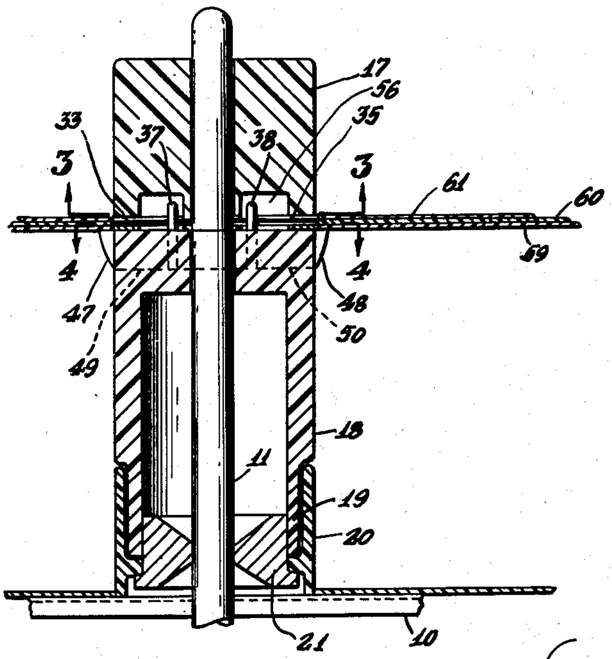
Fig. 1 is a vertical cross-section of the adapter mounted on a phonograph spindle.
Figure 3:
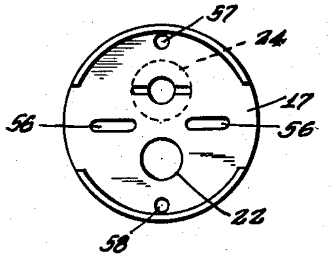
Figure 4:
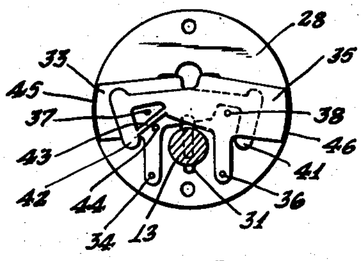
Figure 5:
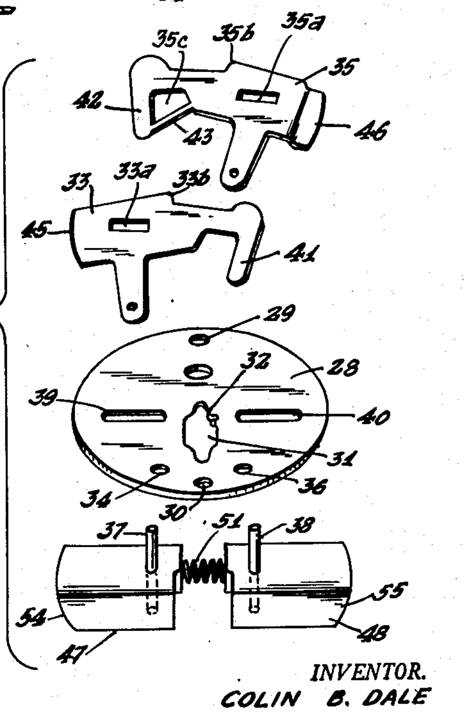
Figure 6:
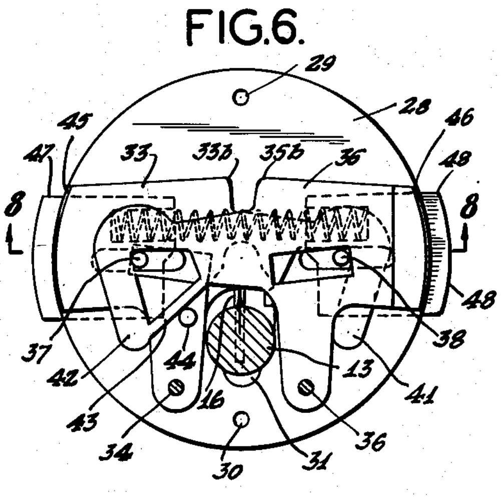
Figure 7:
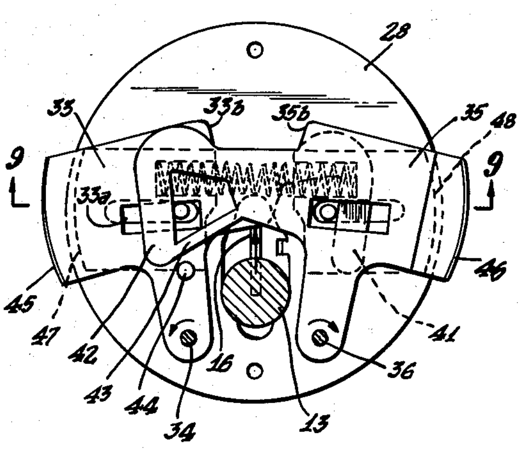
Figure 8:
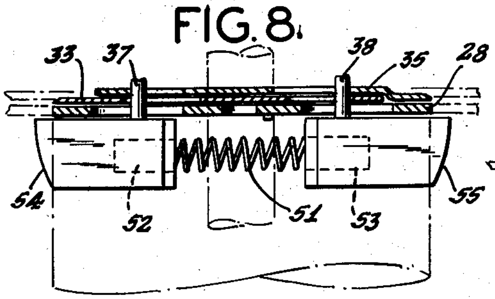
Figure 9:
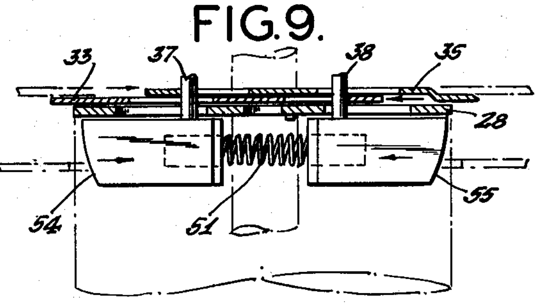
Figure 10:
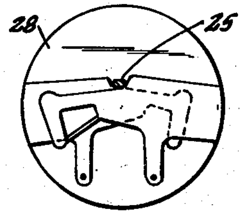
Figure 11:
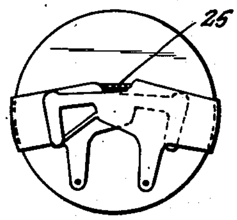
Figure 12:
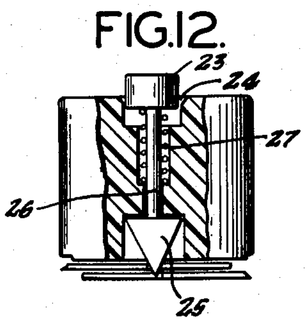
Figure 13:
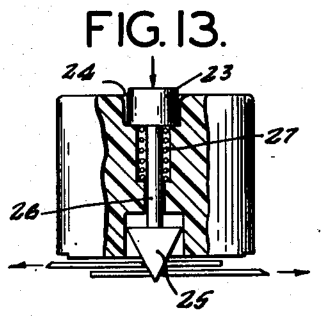

Figs. 3 and 4 are sections along lines 3—3 and 4—4 of Fig. 1;

Fig. 5 is an exploded perspective view of movable record supporting elements of the adapter;

Figs. 6 and 7 are enlarged top plan views showing in two extreme positions the blades by means of which may be supported the record next to the bottom one of the stack;

Fig. 8 is a section along lines 8—8 of Fig. 6;

Fig. 9 is a section along lines 9—9 of Fig. 7;

Figs. 10 and 11 correspond to Figs. 6 and 7 to explain the functioning when the adapter is manually operated; and Figs. 12 and 13 are vertical cross-sections of the hand operating button in the top of the adapter.

The adapter is employed in a phonograph having the customary turntable 10 from which projects a non-rotatable spindle 11. The spindle has a shoulder 12 separating its top or pilot portion 13 from the body of the spindle. Records provided with small holes, i. e. holes of .281" diameter, can be stacked on the shoulder 12 and during the operation of the phonograph will be pushed off the shoulder by means of a pivoted head or latch 16 which may be raised by means of a riser 14 and then moved about its pivot point in order to push the lowermost record of the stack off the shoulder 12. The next record of the stack will then settle on the shoulder 12. The adapter is arranged to be mounted on such well-known spindle whenever it is desired to play records having large center holes (of a diameter of 1½").

The adapter is a cylinder of appropriate diameter to center large hole records 59—61, and may be considered as divided into three elements: A top element 17, a central or second element 18 attached at its top to element 17 and having a recessed base 19, and a bottom or third element 20 rotatably mounted on the recessed base 19 of the second element 18 by means of a bushing 21. The spindle 11 projects through the three elements of the adapter and is positioned therein by bushing 21, the top of 18 and by 17.

The top element 17 is a plastic cylinder having an off-center vertical bore 22 through which projects the pilot portion 13 of the spindle. The manual playing of records may be controlled by a push button 23 which is movably mounted within another vertical bore of element 17 said vertical bore terminating in a hollowed out portion 24 in the top of the element 17. A wedge 25 having a shaft 26 is fastened to the push button 23 and may be moved downwards by means of the push button 23 against the tension of a coiled spring 27 provided within the vertical bore of the element 17.

Fastened to the top of the second element 18 is a metal wall or mounting plate 28. The plate 28 has an off-center generally keyhole-shaped opening 31 through which passes the spindle with the side of the shoulder 12 of the spindle engaging a lug 32 projecting from the body of mounting plate 28 within the opening 31. By seating the adapter so that the shoulder 12 of the spindle will thus be engaged, the device will be correctly positioned.

Two upper horizontal supports or blades, adapted to support the record next to the bottom one of the stack, are pivotally mounted on the mounting plate 28. One of the blades is 33 whose pivotal mounting is indicated at 34, and the other blade is 35 whose pivotal mounting is indicated at 36. The blade 33 has a slot 33a through which a pin 37 projects, and the blade 35 an opening 35a through which a pin 38 projects. Pins 37 and 38 extend downward through horizontal slots 39 and 40, respectively, of the mounting plate 28. The upper end of the pin 37 projecting through the blade slot 33a engages the hooked end 42 of blade 35, and the end of pin 38 projecting through blade-slot 35$a$ engages the hooked end 41 of the blade 33. A hole 35$c$ in blade 35 is defined by hooked end 42 and blade position 43, which in the normal position is engaged by a pin 44 projecting upward from the blade 33. When blades 33 and 35 are rotated by lateral pressure from head or latch 16 engagement between pin 44 and the bridge 43 insures that upon pressure being removed by latch 16, blades 33 and 35 will retract in unison to their inward or rest position.

Normally the blades are completely within the confines of the adapter. However, when the two blades are rotated, the pins 37 and 38, being engaged by the lagging edges of slots 33$a$ and 35$a$, will be moved outward within the slots 39 and 40, and the ends 45 and 46 of the blades will protrude beyond the outside circumference of the element 17 to support the next to the last record in the stack.

Two lower horizontal supports or shelves 47 and 48 for the bottom record of the stack are mounted within channels 49 and 50 cut in diagonally opposed portions of the top of the second cylindrical element 18. The shelves are normally pressed outwardly to protrude beyond the outside circumference of the adapter by means of a coiled spring 51 seated in cups 52 and 53 within the shelves. The tops of the protruding ends of the shelves (Figs. 1, 8) support the bottom record 59 at diametrically opposed points of the center hole. The sides of the protruding shelf ends are sloping as indicated at 54 and 55. The shelves may be moved against the tension of the spring 51 by means of pins 37, 38 whose lower ends are fastened to the blades.

When thus moved inward, the ends of the shelves will be pulled within the confines of the adapter to drop the bottom record of the stack 59 towards the turntable. At the same time, the blades 33, 35 are, via pins 47 and 38 and the leading edges of slots 33$a$ and 35$a$, rotated outward to project between the bottom record 59 and the next record 60 so as to sustain records 60, 61 and all other records above the bottom record. When the shelves 47, 48 are again pushed out by the spring 51 to sustain the bottom record, the blades 33 and 35 will be again drawn within the adapter.

The free ends of pins 37, 48 project through the hooked ends 41, 42 of blades 33, 35 into recesses 56 in the bottom face of element 17 where they are free to move.

The elements 17 and 18 of the adapter are fastened together by rivets or screws projecting through vertical perforations 57, 58 of 17 and holes 29 and 30 of mounting plate 28.

Figure 2:
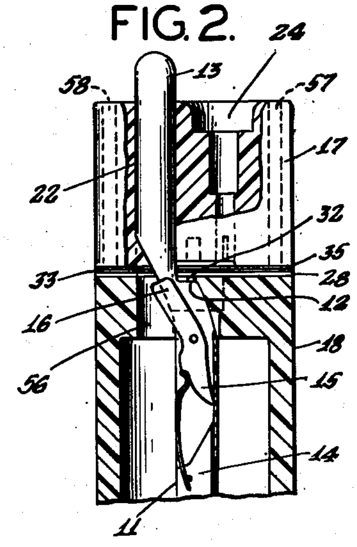
Fig. 2 is another vertical cross-section, 90° displaced with respect to Fig. 1.

The blades 33 and 35 may be caused to rotate to protrude and thus pull in the shelves 47, 48 by means of the spindle latch 16 which, as is well known, is actuated during a predetermined cycle of the phonograph record changer mechanism (not shown) to push off the record from the spindle shoulder 12. With the adapter mounted on the spindle, instead of pushing off a record, the latch 16 will engage the blades 33 and 35 to rotate them from the position shown in Fig. 6 into the position shown in Fig. 7. When during the record changer cycle the latch 16 is released and returns within the spindle (Fig. 2), the spring 51 will start pushing out the shelves 47 and 48 and through pins 37, 38 will rotate the blades back into their normal position to release the records which they had supported, dropping them on the shelves 47, 48, the ends of which now protrude beyond the adapter.

The record pushed off the shelves 47, 48 will be guided by the second element 18 and the third element 20 onto the platform 10. They may be removed by pulling them up which, through the sloping or camming ends 47, 48, will force the shelves within the adapter. This will leave the blades 33 and 35 in their normal position since the pins 37 and 38 are free to move within slots 33$a$ and 35$a$.

The point of wedge 25 (Figs. 10–13) is normally within the space confined by shoulders 33$b$ and 35$b$ of the blades. When it is desired manually to change a record without regard to the cycle of the mechanism, the button 23 is depressed against the tension of spring 27, causing the wedge 25 to cam the blades 33 and 35 towards their actuated position. This will have the same consequences as when the blades were operated by the spindle latch, i. e. the shelves 47, 48 will be pulled in to drop the bottom record, and pushed out again to catch the remainder of the stack when the button 23 is released and the blades 33 and 35 are permitted to return to their normal positions as previously described.

During playing of a record the spindle and adapter will be stationary, except for the sleeve or bottom element 20 which rotates with the turntable 10.

What I claimed is:

1. For use with a phonograph having a rotatable turntable, and a spindle of relatively small diameter provided intermediate its ends with a shoulder to support a stack of records having center holes of correspondingly small diameter, said spindle mounting within itself a head to push off the record resting on the shoulder; an adapter having a first element for receiving and centering with respect to the portion of the spindle above the shoulder a stack of records having large diameter center holes, said element having an opening for receiving the portion of the spindle above the shoulder, a second element attached to the first element and internally divided therefrom by a mounting plate, two upper horizontal supports normally confined within the first element mounted on the plate in cooperative relation with the pushoff head of the spindle, means controlled by the head for actuating said supports laterally to protrude beyond the outside circumference of the first element to support the second record from the bottom of the stack at the edge of its center hole, two lower horizontal supports within the second element below the mounting plate normally protruding beyond the outside wall of the second element to support the lowermost record of the stack at the edge of its center hole, and a motion transmitting interconnection between the upper and lower supports to contract the lower supports within the confines of the second element when the first supports are actuated to protrude beyond the first element.

2. The device according to claim 1, and means operable at will and accessible from outside the first element for actuating the first supports.

3. For use with a phonograph having a rotatable turntable, and a non-rotatable spindle of relatively small diameter provided intermediate its ends with a shoulder to support a stack of records having center holes of correspondingly small diameter, said spindle mounting within itself a head to push off the record resting on the shoulder, an adapter having a first element for receiving and centering with respect to the portion of the spindle above the shoulder a stack of records having large diameter center holes, said element having an axial opening for receiving the portion of the spindle above the shoulder, a second element attached to the first element, two upper horizontal supports normally confined within the first element pivotally mounted in cooperative relation with the pushoff head of the spindle, a spring linking said upper supports, means responsive to the head to rotate said upper supports on their pivots against the tension of said spring laterally to protrude beyond the outside wall of the first element to support the second record from the bottom of the stack at the edge of its center hole, two lower horizontal supports within the second element, a spring normally forcing the two lower supports to protrude beyond the confines of the second element to provide supporting shelves for the lowermost record of the stack at the edge of its center hole, a motion transmitting interconnection between the upper and lower supports to compel contraction of the lower supports within the confines of the second element when the first supports are actuated to protrude beyond the first element, and means operable at will and accessible from outside the first element for rotating the first supports on their pivots.

4. The device according to claim 3, and in which the last mentioned means is a spring pressed push button, and a wedge carried thereby and engaging shoulders on the upper supports to cause their rotation.

5. For use with a phonograph having a rotatable turntable, and a non-rotatable spindle of relatively small diameter provided intermediate its ends with a shoulder to support a stack of records having center holes of correspondingly small diameter, said spindle mounting within itself a head to push off the record resting on the shoulder; an adapter having a first cylindrical element for receiving and centering with respect to the portion of the spindle above the shoulder a stack of records having large diameter center holes, said element having an axial opening for receiving the portion of the spindle above the shoulder, a second cylindrical element attached to the first element and internally divided therefrom by a transverse wall having a central opening through which the spindle projects, a lug on the wall projecting within the opening into engagement with the shoulder to seat the first element on the spindle in a predetermined position, two blades normally confined within the first element pivotally mounted on the upper face of the wall in cooperative relation with the pushoff head of the spindle, said blades being so interlinked that when the head engages one, both will rotate on their pivots laterally to protrude beyond the outside circumference of the first element to support the second record from the bottom of the stack at the edge of its center hole, two shelves within the second element below the wall, a spring within the second element normally forcing the two shelves to protrude beyond the outside circumference of the second element to provide supports for the lowermost record of the stack at the edge of its center hole, the protruding ends of the shelves being sloping to permit removal of records by forcing the shelves within the confines of the second element against spring tension, a motion transmitting interconnection between the shelves and blades to compel contraction of the shelves within the confines of the second element when the blades are actuated to protrude beyond the first element, a push button operable at will and accessible from outside the first element means responsive to said push button for rotating the blades on their pivots, a third cylindrical element for said adapter resting on the turntable, and a bushing through which the spindle projects for rotatably mounting the third element on the second.

6. For use with a phonograph having a rotatable turntable, and a non-rotatable spindle of relatively small diameter provided intermediate its ends with a shoulder to support a stack of records having center holes of correspondingly small diameter, said spindle mounting within itself a head to push off the record resting on the shoulder; an adapter having a first cylindrical element for receiving and centering with respect to the portion of the spindle above the shoulder a stack of records having large diameter center holes, said element having an off-center axial bore through which passes the portion of the spindle above the shoulder, a second cylindrical element, means traversing the first element for fastening it to the second element, a mounting plate on top of the second element and having a central opening through which the spindle projects, a lug on the plate projecting within the opening into engagement with the shoulder to seat the first element on the spindle in a predetermined position, two blades normally confined within the first element pivotally mounted on the upper face of the plate in cooperative relation with the pushoff head of the spindle, said blades having slots and overlapping hooked ends, said blades being arranged for joint rotation on their pivots laterally to protrude beyond the outside circumference of the first element to support the second record from the bottom of the stack at the edge of its center hole, two shelves within the second element below the plate, a spring within the second element normally forcing the two lower supports to protrude beyond the circumference of the second element to provide supporting shelves for the lowermost record of the stack at the edge of its center hole, the protruding ends of the shelves being sloping to permit removal of records by forcing the supports within the confines of the second element against spring tension, a motion transmitting interconnection between the upper and lower supports, including a pin fastened to each shelf and projecting through slots in the mounting plate, the blades and the hooked blade ends into recesses in the bottom of the first element, whereby the shelves will be contracted within the confines of the second element when the blades are actuated to protrude beyond the first element, and means operable at will and accessible from outside the first element for rotating the blades on their pivots.

7. The device according to claim 1, and in which the first and second elements of the adapter have the same diameter, the first element surrounding the spindle from the shoulder to near its upper end, and the second element surrounding the spindle from the shoulder to near the lower end.

COLIN B. DALE.

References Cited in the file of this patent

UNITED STATES PATENTS

| Number | Name | Date |
|---|---|---|
| 1,568,130 | Blackwell | Jan. 5, 1926 |
| 1,969,895 | Loughridge | Aug. 14, 1934 |